(No Model.)
L. C. RYAN.
CHURN.
No. 548,095. Patented Oct. 15, 1895.
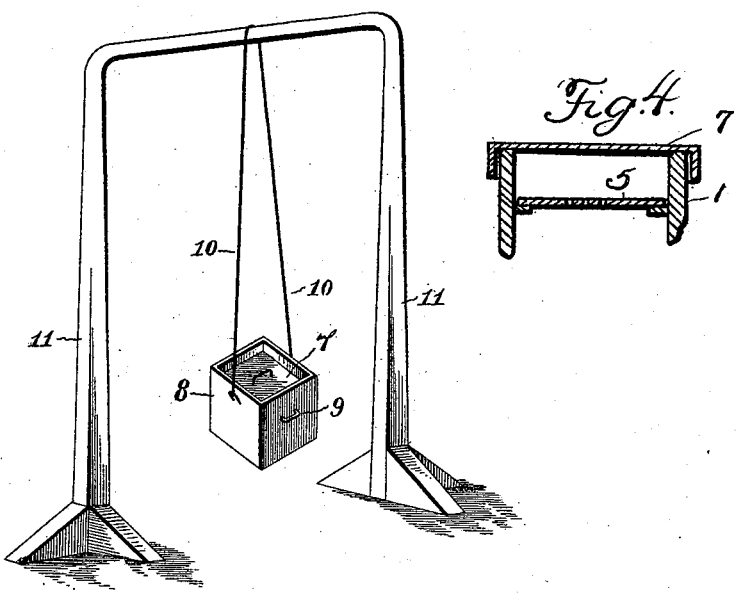
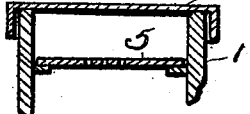
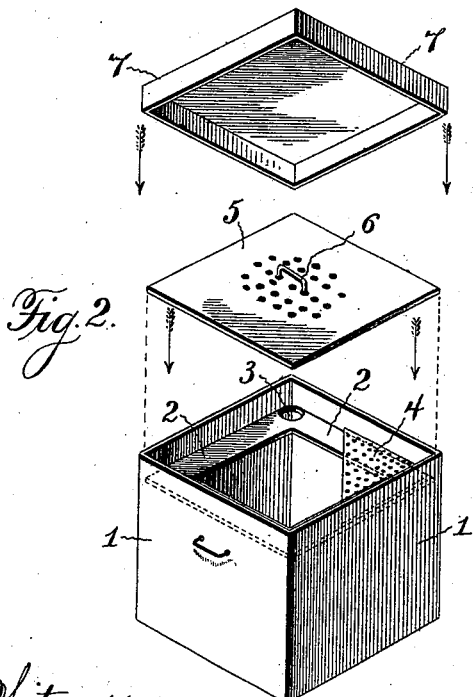
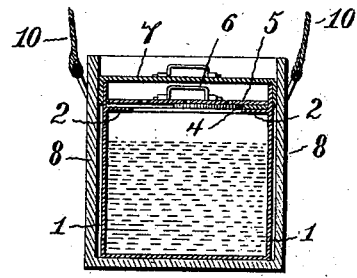
Witnesses:
Jas. E. Hutchinson.
G. W. Rea.
Inventor.
L. C. Ryan,
By James L. Norris.
Attorney.

UNITED STATES PATENT OFFICE.

LAWRENCE C. RYAN, OF HAWKINSVILLE, GEORGIA.

CHURN.

SPECIFICATION forming part of Letters Patent No. 548,095, dated October 15, 1895.

Application filed September 20, 1894. Serial No. 523,632. (No model.)

*To all whom it may concern:*

Be it known that I, LAWRENCE C. RYAN, a citizen of the United States, residing at Hawkinsville, in the county of Pulaski and State of Georgia, have invented new and useful Improvements in Churns, of which the following is a specification.

My invention relates to an improved churn, and has for its object to provide a churn wherein the milk or cream is subjected to violent agitation with the expenditure of a minimum amount of labor, resulting in the rapid formation of the butter; and to this end my invention consists in a churn constructed and operating in the manner hereinafter fully described and claimed, due reference being had to the accompanying drawings, forming a part of this specification, wherein—

Figure 1 is a perspective view of my improved churn, showing it suspended in position for operation. Fig. 2 is a perspective view of the churn, the parts being shown separated. Fig. 3 is a vertical section thereof. Fig. 4 is an enlarged detail sectional view of the upper portion of the churn and its cover.

Referring to the drawings, the numeral 1 designates the churn-body, consisting of a rectangular vessel, preferably formed of sheet metal. Upon the interior of said churn and a slight distance below the top thereof is formed an inwardly-projecting flange 2, extending entirely around the four sides, said flange at one of the corners being provided with a perforation, as at 3, through which the milk and water may be discharged, and in the opposite corner is arranged a strainer, consisting of a foraminous metallic plate 4, secured to the flange 2 by solder or other suitable means. Adapted to rest upon the flange 2 is a false top consisting of a perforated metallic plate 5, provided with a handle 6, said top operating to prevent the contents of the churn from splashing out as the churn is agitated, the perforations serving for the admission of air. When the vessel is used as a creaming-can and serving, also, to convey back into the vessel such cream as may splash out and upon the false top during the churning operation, a loose cover 7 is employed to close the churn. The perforations serve the double purpose of admitting the air to the interior of the churn that enters under the loose cover 7, and also to rapidly return to the churn the milk that is forced between the flange and the false top as the churn is agitated, the said false top preventing the milk from being thrown violently against the loose cover 7 and being thus forced under the edges of said cover and lost. I provide a support for the churn, consisting of a rectangular box 8, preferably made of wood, open at the top and provided with a handle or handles 9, to the sides of which are secured the ends of a cord or wire 10, by means of which said box or casing may be suspended from any suitable support, as 11. Said support 11 may consist of a hook or bracket that may be secured in any convenient place that may be preferred.

The operation of my improved churn is as follows: The milk and cream are placed within the churn 1, the false top 5 placed in position on the flange 2, and the cover 7 placed over the top of the churn. The churn is then placed within the casing 8, which is suspended by means of the cord or wire 10 in the manner before described. The operator then moves the box or casing 8 back and forth, at the same time giving it a slight twist to the right or left. This communicates to the milk and cream a motion from front to rear and from rear to front of the churn, an undulating motion from side to side, and a continuous rotary movement, the sides of the churn operating as so many dashers. The milk and cream are thus violently agitated, and the rotary movement causes the rapid formation of the butter globules. As soon as the butter is produced the milk is poured off through the strainer, water is poured into the churn, and the butter is thoroughly washed therein. The water is then poured off through the perforation 3, when the butter may be salted.

By making the churn removable from the box or casing the operation of cleansing the churn is greatly facilitated and the churn may also be taken from said box or casing and be placed in water to cool the milk and cream or before a fire to warm the same, it being thus possible to at all times have the milk and cream at the proper temperature for churning.

It will be understood that the motion communicated to the churn is not a swinging motion, the churn being given a slight twist to the right or left as it is moved backward and forward, as before described, which gives the milk in the churn a rapid circular movement, and this centrifugal motion throws the milk violently from corner to corner of the churn against the sides thereof, producing the butter rapidly.

The churn, owing to its simplicity and the absence of all operating mechanism, may be manufactured very cheaply and is very durable, and the force or power necessary to operate it is reduced to a minimum.

I have shown the churn as suspended from a hook or bracket, but it will be readily apparent that it may be suspended from any suitable support.

Having described my invention, what I claim is—

1. A churn comprising a rectangular vessel 1 having an inwardly projecting flange 2 arranged upon its interior near the top, an outlet 3 formed in one corner of said flange, a loose imperforate cover removably seated over the top of the vessel 1, and a perforated false top 5 consisting of a flat plate centrally perforated, said false top being seated upon said flange intermediate the top and the liquid level of the churn, substantially as described and for the purpose specified.

2. A churn comprising a rectangular vessel 1 having an inwardly projecting flange 2 arranged upon its interior near the top, a loose imperforate cover 7 removably seated over the top of the vessel 1, a perforated false top 5 consisting of a flat plate centrally perforated, said false top being seated upon said flange intermediate the top and the liquid level of the can, a rectangular supporting case 8 open upon its upper side, a suspending cord or wire secured to two sides of the case, and handles secured to the adjacent sides of said case, the vessel 1 being removably seated in the supporting case, substantially as shown and described.

In testimony whereof I have hereunto set my hand in presence of two subscribing witnesses.

LAWRENCE C. RYAN.

Witnesses:
S. A. WAY,
F. H. BOZEMAN.